(12) United States Patent
Pendleton (10) Patent No.: US 7,120,636 B2
(45) Date of Patent: Oct. 10, 2006

(54) METHOD OF COMMUNICATING DATA BETWEEN COMPUTERS HAVING DIFFERENT RECORD FORMATS

(76) Inventor: William W. Pendleton, 1131 N. Saint Clair St., Pittsburgh, PA (US) 15206

(*) Notice: Subject to any disclaimer, the term of this patent is extended or adjusted under 35 U.S.C. 154(b) by 627 days.

(21) Appl. No.: 10/333,897

(22) PCT Filed: Jul. 25, 2001

(86) PCT No.: PCT/US01/23364

§ 371 (c)(1),
(2), (4) Date: Jan. 24, 2003

(87) PCT Pub. No.: WO02/08947

PCT Pub. Date: Jan. 31, 2002

(65) Prior Publication Data

US 2004/0139076 A1    Jul. 15, 2004

(51) Int. Cl.
*G06F 17/30* (2006.01)
*G06F 7/00* (2006.01)

(52) U.S. Cl. .................. 707/10; 707/101; 709/217

(58) Field of Classification Search .............. 707/3, 707/9, 10, 100–102, 104.1, 200, 203; 709/201, 709/202, 217, 224, 232, 236, 203, 223, 237; 705/2–4, 34
See application file for complete search history.

(56) References Cited

U.S. PATENT DOCUMENTS

| 5,687,373 | A | * | 11/1997 | Holmes et al. | 719/328 |
| 5,924,074 | A | * | 7/1999 | Evans | 705/3 |
| 5,974,238 | A | * | 10/1999 | Chase, Jr. | 709/248 |
| 6,006,274 | A | * | 12/1999 | Hawkins et al. | 709/248 |
| 6,088,677 | A | * | 7/2000 | Spurgeon | 705/4 |
| 6,757,898 | B1 | * | 6/2004 | Ilsen et al. | 709/203 |
| 6,873,841 | B1 | * | 3/2005 | Sagar | 455/414.4 |
| 2003/0084024 | A1 | * | 5/2003 | Christensen et al. | 707/2 |

* cited by examiner

*Primary Examiner*—Greta Robinson
*Assistant Examiner*—Jacques Veillard
(74) *Attorney, Agent, or Firm*—The Webb Law Firm (57) ABSTRACT

A method of communicating data between databases having different formats includes providing a first computer (4), a second computer (14), and a server (22) in a distributed computer network (2) where the server (22) is configured to send, receive, and process data packets including records having different formats to and from the first computer (4) an the second computer (14). The server (22) converts a first record in a first format (26*a*) into the first record in the second format (26*b*) and converts a second record in the second format (26*b*) into the first format (26*a*). The second computer is configured to receive data packets having the first record in the second format (26*b*), and to send data packets having the second record in the second format (26*b*).

10 Claims, 7 Drawing Sheets

METHOD OF COMMUNICATING DATA BETWEEN COMPUTERS HAVING DIFFERENT RECORD FORMATS

BACKGROUND OF THE INVENTION

1. Field of the Invention

The present invention relates to a method of communicating and converting data of different formats between databases having different designs.

2. Description of the Prior Art

Typically, a medical service provider has database software installed on a general purpose computer for maintaining for each patient serviced by the medical service provider one or more electronic records. Each of these records includes data regarding a patient, such as notes regarding the patient's condition, services rendered on a particular date by the medical service provider for the patient, fees associated with one or more of the rendered services, and the like. This data is often maintained for each patient of the medical service provider as an electronic patient record in the database which has been designed specifically by or for the medical service provider.

Insurers also have database software installed on a computer for creating and maintaining for each insured patient one or more electronic patient records that include some or all of the same information as the electronic patient record maintained by the patient's medical service provider. Unfortunately, however, electronic patient records of a medical service provider often have a different design than the electronic patient records of a particular patient's insurer. To this end, it is common practice for many medical service providers to treat numerous patient, each of whom may be insured by a different insurer having databases of different design.

In order to account for the differences in design of the database of a medical service provider and the design of the database of an insurer for a patient, an insurer often provides the medical service provider with data entry software which enables the medical service provider to electronically enter data regarding a patient into an interface screen and thereafter forward this entered data to the insurer for processing. More specifically, this data entry software is configured to receive the data into predetermined fields, including one or more patient identification fields, of a record for the particular patient. Once data is entered into these predetermined fields, the software program formats the entered data into a form that the database software of the patient's insurer is expecting and electronically transfers the formatted data to the database software of the patient's insurer for processing.

A problem with such data entry software is that the medical service provider, in addition to entering data regarding a patient into their own database, needs to enter some or all of the same patient data into the data fields of the data entry software so that this data can be processed by the particular patient's insurer. As can be seen, when a medical service provider is sending data regarding patients to a plurality of different insurers, a plurality of different data entry software must be maintained by the medical service provider and utilized to effect entry and transfer of patent data to each insurer.

A problem with this arrangement is the need for the medical service provider to acquire the appropriate data entry software for the insurer of a particular patient and the need for the medical service provider to redundantly enter data into the medical service provider's database and the data entry software. Another problem is that a medical service provider may be required to become familiar with more than one data entry software. Furthermore, from the standpoint of each insurer, there are logistical problems maintaining the integrity of the release and version of data entry software utilized by numerous medical service providers.

It is therefore, an object of the present invention to overcome the above problems and others by providing a method of communicating data across a distributed computer network between computer systems having different record formats. Is an object of the present invention to provide a method where IP addresses of a transmitter and a receiver accompany a data packet to its ultimate destination while the data packet is routed through one or more designated intermediate receivers. Still other objects will become apparent to those of ordinary skill in the art upon reading and understanding the following detailed description It is a second object of the present invention

SUMMARY OF THE INVENTION

Accordingly, we have invented a server comprised of conversion routines configured to convert patient records from one format into another format. A record format used by a transmitter database is sent by the transmitter to an intermediary server. The server selects the appropriate conversion routine by determining who is the transmitter of the record and who is the receiver of the record. Alternatively, the medical service provider record may explicitly indicate to the server which conversion routine is to be used. The actual conversion entails manipulations including, but not limited to literal transformations, truncations, and concatenations of record components, such as description fields, data fields, and datatype fields. Upon completion of the conversion, the server transmits the converted record to the insurer for processing in the insurer database. In connection with processing of the converted record, the insurer may transmit back to the medical service provider, through the server, an acknowledgement in the form of a record. In response to receiving the acknowledgement record, the server converts the record format used by the insurer database into a record format compatible with the medical service provider database. Upon completion of the conversion, the server transmits the converted acknowledgement record to the medical service provider for processing in the medical service provider database.

While described in connection with a transaction between an insurer and a medical service provider, the present invention can also be used for data transfer between other entities having incompatible data records. For example, the use of the present invention can be enhanced to include transfer of data to and from data records of employers of insured patients, an insurance broker and/or sub-broker, and other insurance group programs. It should be appreciated that the data can be transmitted to multiple successive conversion servers prior to the data reaching its ultimate receiver. It should be further appreciated that the data can also be transferred to more than one server, in order to arrive at multiple receivers for processing.

The foregoing and other features of the method of the present invention will be further apparent from the description which follows.

BRIEF DESCRIPTION OF THE DRAWINGS

Other important objects and features of the invention will be apparent from the following detailed description of the invention, taken in connection with the accompanying drawings in which.

DETAILED DESCRIPTION OF THE PREFERRED EMBODIMENTS

The present invention will be described with reference to the accompanying Figs. where like reference numbers correspond to like elements.

Figure 1:
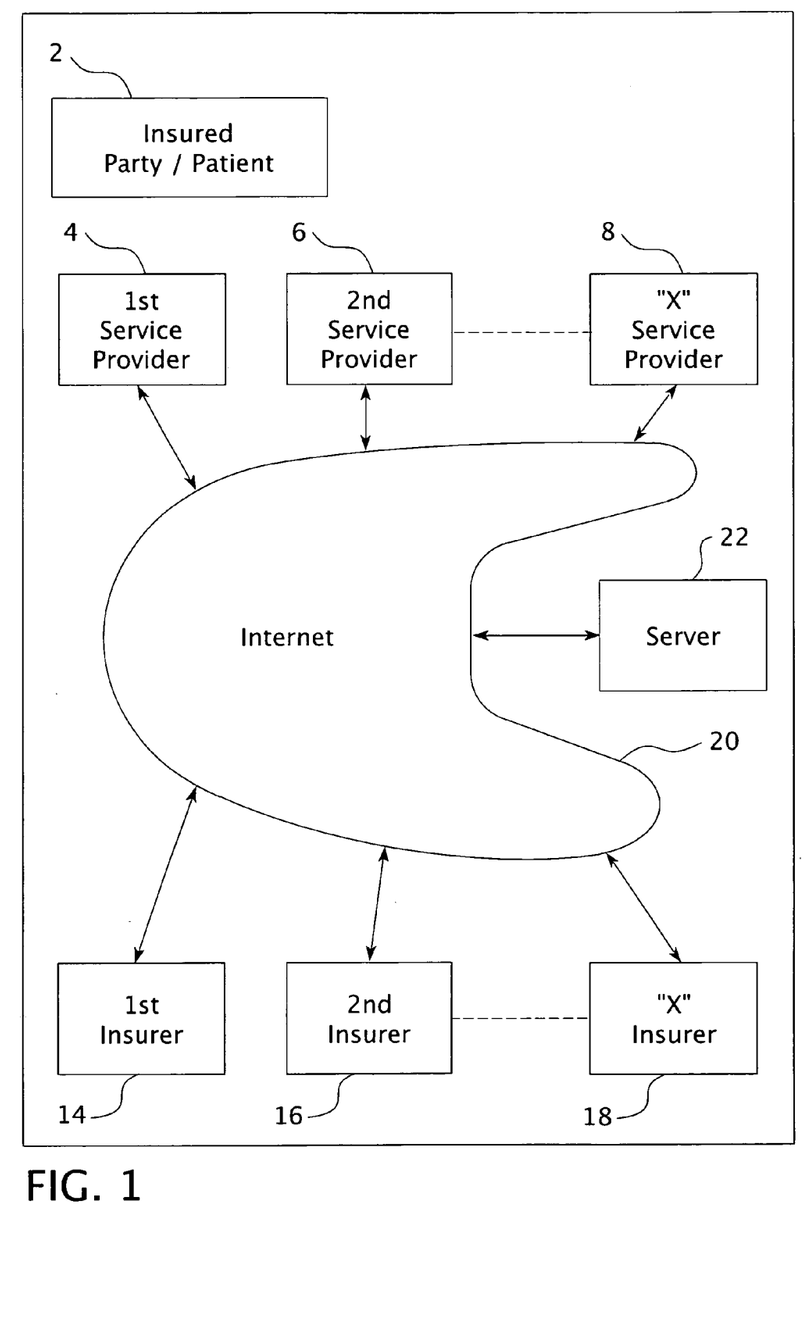
FIG. 1 is a schematic drawing of service providers, insurers, and a server communicating with each other across a distributed computer network.

With reference to FIG. 1, in connection with a medical insurance contract, a party or patient 2 covered by medical insurance issued by an insurer 14, 16, . . . , 18 receives services from one or more medical service providers 4, 6, . . . , 8, such as a doctor or physician, a hospital, a medical laboratory, and the like.

Figure 2:
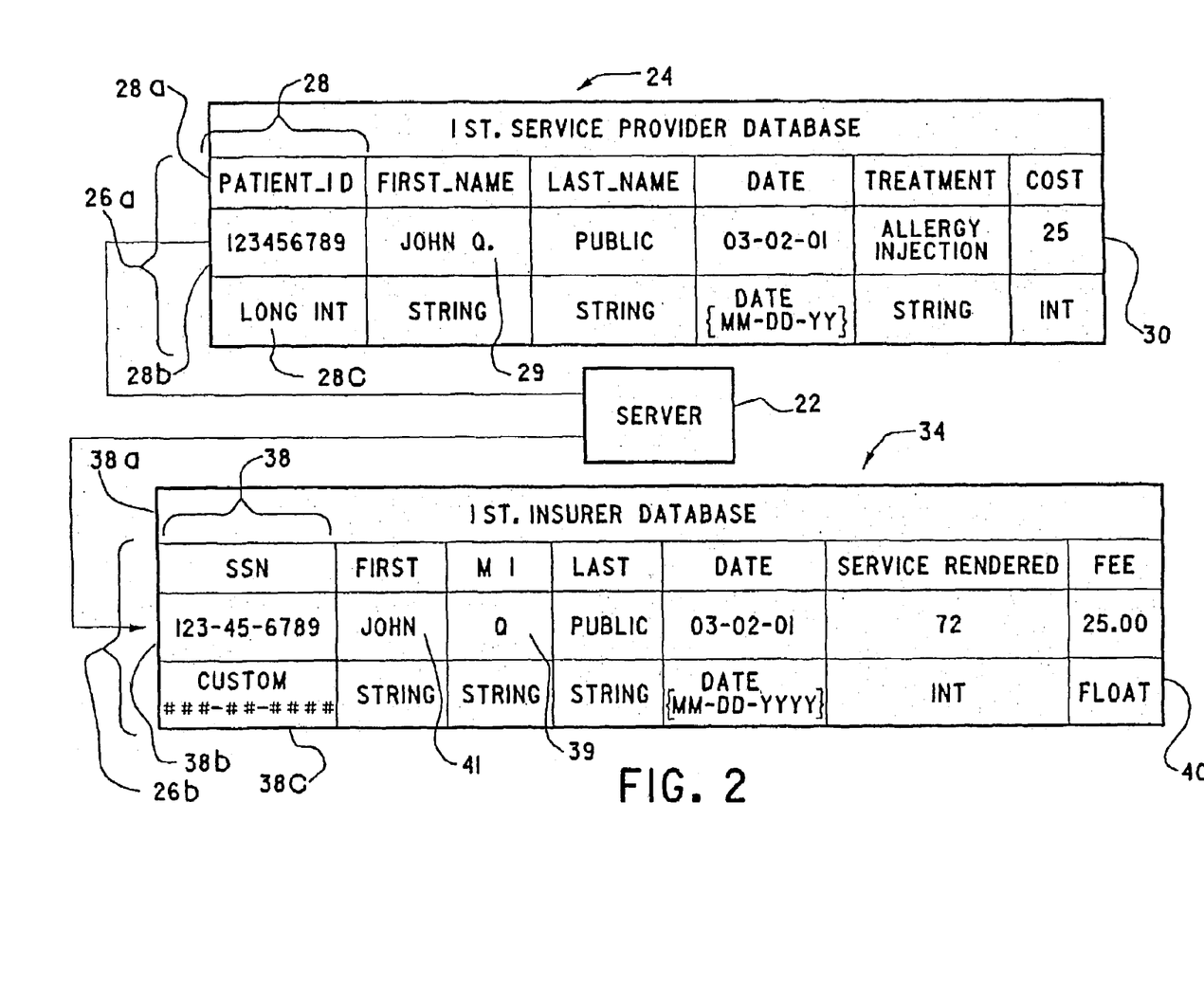
FIG. 2 is a block diagram representing the exchange of data from a service provider database to a insurance database through the server.

The present invention connects each service provider, 4, 6, . . . , 8 and each insurer 14, 16, . . . , 18 to the Internet 20 and provides a server 22 connected to Internet 20. Each medical service provider, 4, 6, . . . , 8 and each insurer 14, 16, . . . , 18 is provided with software which directs Internet communications related to a patient record through server 22 for processing, and more specifically, conversion from a first record format to a second record format, and vice versa. With reference to FIG. 2 and continuing reference to FIG. 1, when a service is rendered to a patient, the service provider rendering the service typically forwards to the patient's insurer a claim for the service rendered. For example, if first service provider 4 provides a specific health service to patient 2, first service provider 4 will forward to first insurer 14 information regarding the rendered service. Specifically, this process is initiated by having first service provider 4 enter patient data into a database 24 of first service provider 4. Information concerning each patient is stored in a record 26a of database 24. Record 26a is comprised of a plurality of related fields, e.g., related field 28 which includes a description field 28a, e.g., Patient_ID; data field 28b, e.g. social security number; and datatype field 28c, e.g., long int. Database 24 is designed to have specific formats for datatype field 28c thereby requiring data to conform to specific datatype formats in order to be compatible with record 26a.

Figure 3:
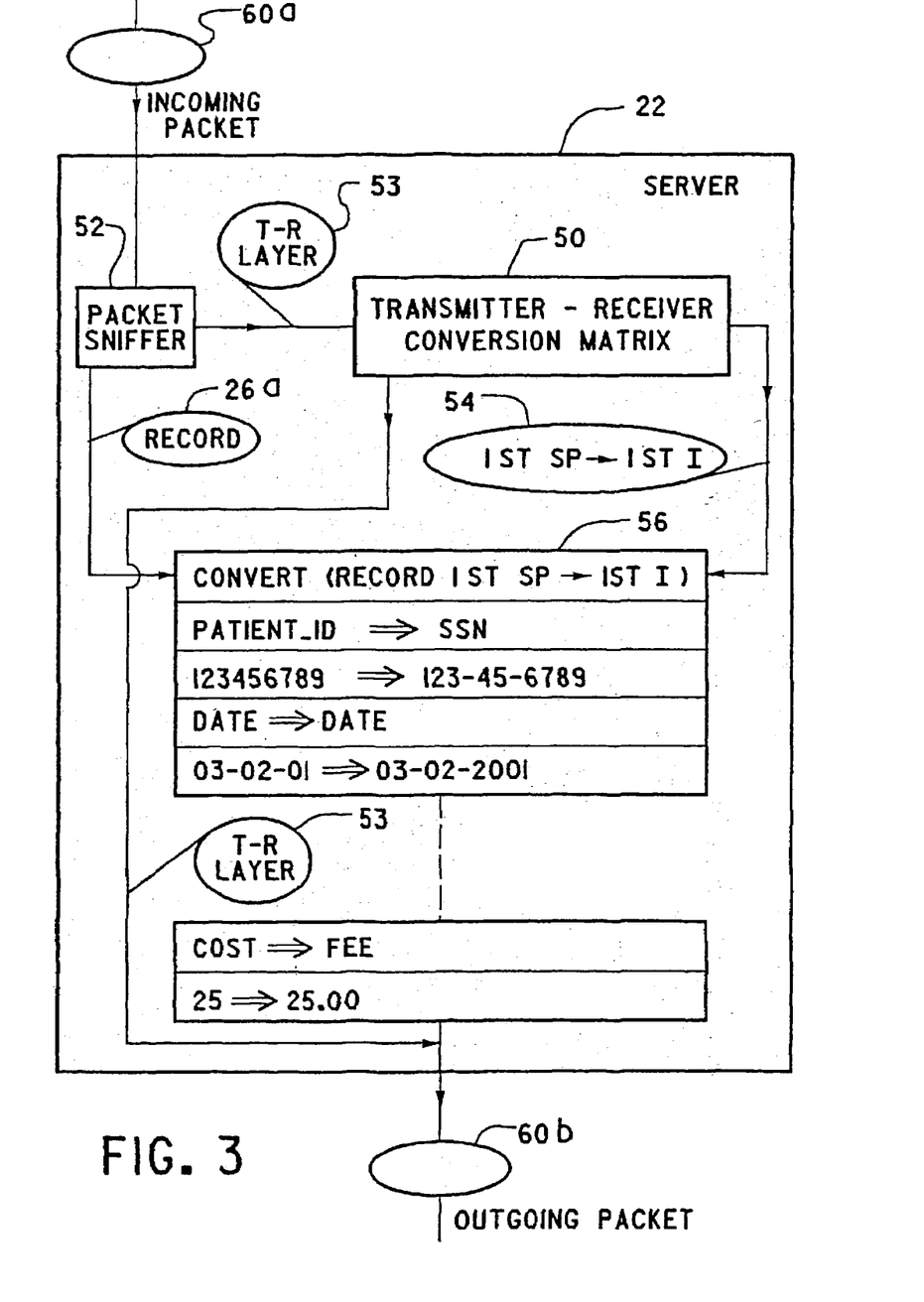
FIG. 3 is a block diagram of the server.
Figure 4:
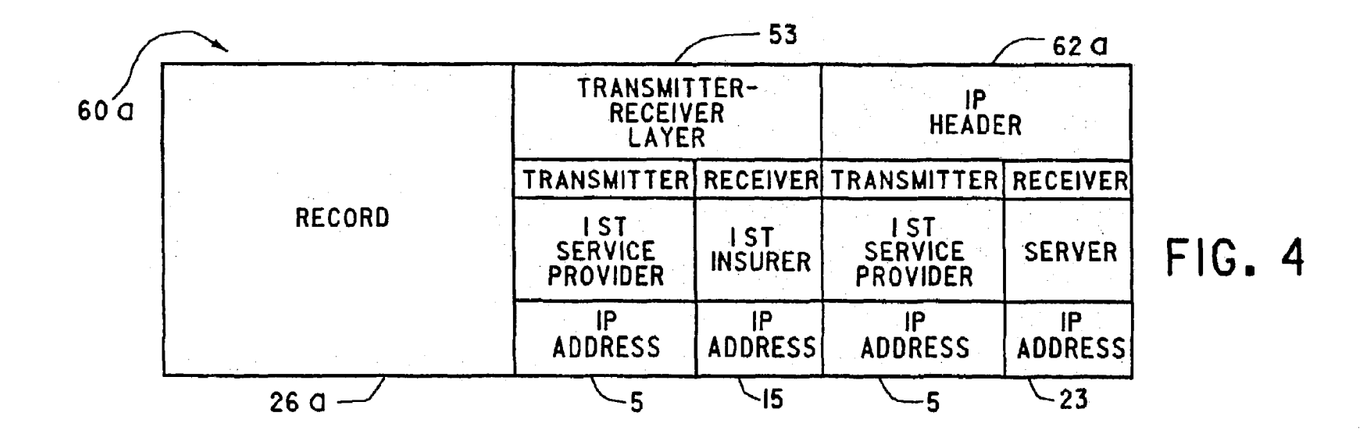
FIG. 4 is block diagram of an incoming packet directed to the server from a service provider database.

With reference to FIGS. 3 and 4 and with continuing reference to FIGS. 1 and 2, at a suitable time first service provider 4 transmits record 26a to an insurer, e.g., first insurer 14. Prior to transmission of record 26a, a transmitter-receiver layer 53 is associated with record 26a. Transmitter-receiver layer 53 identifies the transmitter of record 26a and the receiver of record 26a. Thus, for example, transmitter-receiver layer 53 includes the name and/or Internet Protocol (IP) address 5 of first service provider 4 and IP address 15 of first insurer 14. More specifically, first service provider 4 transmits to server 22 a packet 60a which includes record 26a, transmitter-receiver layer 53, and, in conformity with standard transmission conventions, an IP header 62a designating a receiver IP address 23 of server 22 and transmitter IP address 5 of first service provider 4, which are both utilized to route packet 60a through Internet 20 to server 22.

Figure 5:
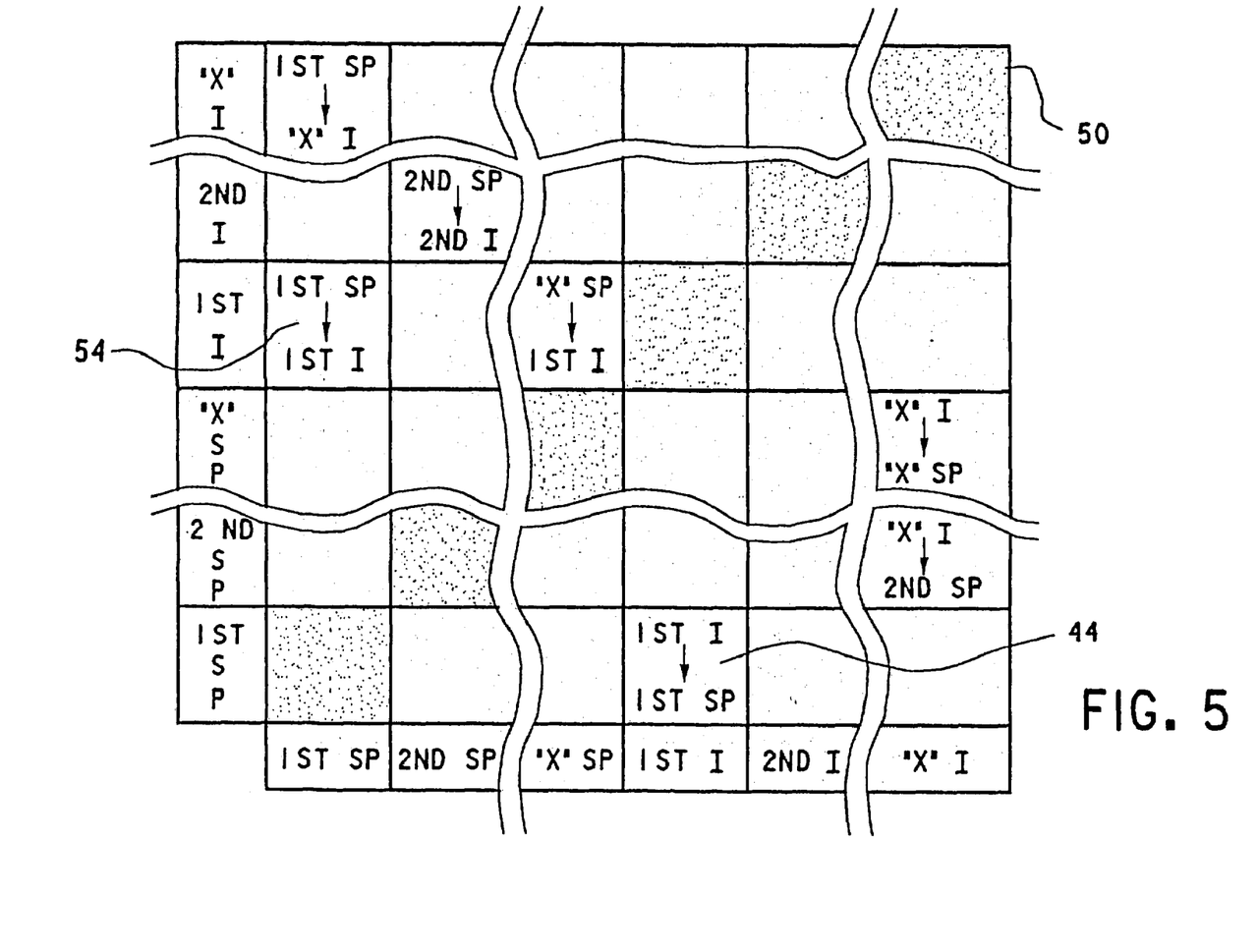
FIG. 5 is a block diagram of the transmitter-receiver conversion matrix of the server.

With reference to FIG. 5 and with continuing reference to FIGS. 2 and 3, server 22 is configured to convert a database record having one format into a database record having a different format. Accordingly, upon receiving packet 60a from first service provider 4, a packet sniffer 52 of server 22 separates the packet into its constituent parts, namely transmitter-receiver layer 53 and record 26a. The transmitter-receiver layer 53 is then scanned by a transmitter-receiver conversion matrix 50 which determines who is the transmitter and who is the receiver. Preferably, the transmitter-receiver conversion matrix 50 includes an X-Y grid where transmitters and receivers line the X-axis and Y-axis, respectively. At an intersection grid point of a transmitter and a receiver resides a conversion routine, or the name of a conversion routine, capable of converting the record format of the transmitter database into a new record compatible with that of the receiver database. The conversion routine is then applied to the transmitter record. More specifically, the transmitter record's description fields, data fields, and datatype fields are converted into description fields, data fields, and datatype fields which match the record format of the receiver database.

For example, suppose that server 22 receives packet 60a from first service provider 4. Packet sniffer 52 separates packet 60a into transmitter-receiver layer 53 and record 26a. Conversion matrix 50 then scans transmitter-receiver layer 53 and determines that record 26a was sent by first service provider 4 to be received by first insurer 14. Transmitter-receiver conversion matrix 50 utilizes this information to identify a conversion routine 54, which can convert the record format of database 24 of first service provider 4 into the record format of a database 34 of first insurer 14. Conversion routine 54 and record 26a are passed to a convert function 56 for processing. Convert function 56 then applies conversion routine 54 to record 26a.

In the instant case, suppose that service provider 4 treats a patient whose social security number is 123456789. Record 26a therefore has description field 28a, "Patient_ID", data field 28b "123456789", and datatype field 28c which indicates that data field 28b is of type long int. Moreover, suppose that record 26b of first insurer 14 does not follow the naming and/or data conventions of record 26a. Namely, record 26b has a description field 38a "SSN", a corresponding data field 38b "123-45-6789", and datatype field 38c which indicates that data field 38b of first insurer 14 is of type custom format. As can be seen, the data format of record 26a of first service provider 4 and the data format of record 26b of first insurer 14 are incompatible with each other and require conversion. To this end, convert function 56 executes conversion routine 54 to convert description field 28a "Patient_ID" into description field 38a "SSN." Additionally, datatype field 28c of record 26a requires that data field 28b for social security number "123456789" have a long integer format, whereas data field 38b of insurer record 26*b* is configured to receive this social security number in custom format, namely, with suitable hyphenation, i.e., "123-45-6789." Convert function 56 converts social security number "123456789" in data field 28*b* into social security number "123-45-6789" which is inserted into data field 38*b* of record 26*b*. Another example of a datatype field conversion is that of an integer 30 in record 26*a* converted to a floating integer 40 in record 38*a*.

Figure 6:
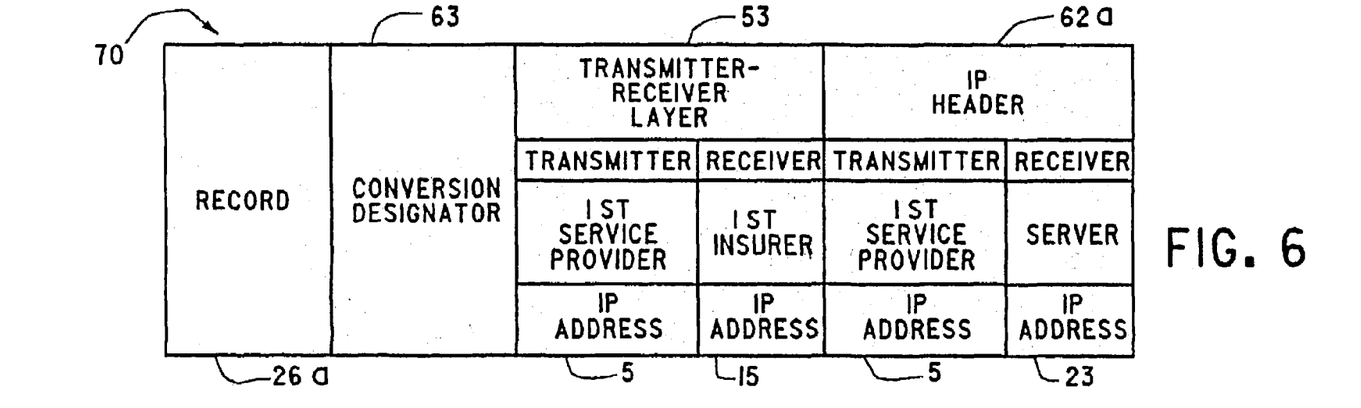
FIG. 6 is a block diagram of an alternative incoming packet directed to the server from a service provider database.

With reference to FIG. 6 and with continuing reference to FIG. 3, a packet 70 illustrates an alternative means of identifying the appropriate conversion routine, e.g., 54, to apply to record 26*a* of first service provider 4. In addition to record 26*a*, transmitter-receiver layer 53, and IP header 62*a*, packet 70 can also include a conversion designator 63. Conversion designator 63 expressly informs server 22 of the conversion routine, e.g., 54, server 22 should use for conversion of record 26*a*. Therefore, the transmitter-receiver conversion matrix 50 lookup is bypassed or eliminated.

With reference to FIGS. 2 and 4, conversion routine 54 can also create new fields and manipulate existing fields in the patient record. For example, record 26*a* can have data field 29 containing an entry "John Q.", thereby including both a first name and a middle initial within the same data field. Insurer record 26*b*, however, designates a first name and a middle initial using two separate data fields. Conversion routine 54 can separate data field 29 containing the entry "John Q." into first name data 41 "John" and middle initial data 39 "Q." Conversion routine 54 must then instantiate these new data fields within record 26*b* of first insurer 14 to receive first name data 41 "John" and middle initial data 39 "Q.".

After convert function 56 has created record 26*b* that is now compatible with database 34 of first insurer 14, record 26*b* needs to be transmitted to first insurer 14 for processing in database 34. Standard Internet transmission protocol, provide for the IP header of a data packet to be discarded upon successful transmission of the data packet between a transmitter and a receiver. For example, suppose that the receiver is server 22 acting as an intermediary between a transmitter, e.g., first service provider 4, and an ultimate receiver, e.g., first insurer 14, for processing and converting the data packet into a different data packet, e.g., 62*b*, to be transmitted to the ultimate receiver. Prior to processing the data packet, e.g., 60*a*, server 22 would ordinarily discard the IP header, e.g., 62*a*, thereby effectively removing any reference to the original transmitter and server 22 itself. The ultimate receiver now has no knowledge of the original transmitter, nor does server 22 have any knowledge of the ultimate receiver. As in the present invention, there are circumstances, such as identification of the original transmitter by the ultimate receiver, and vice versa, which require data packets to maintain the IP address of the transmitter and the ultimate receiver.

Figure 7:
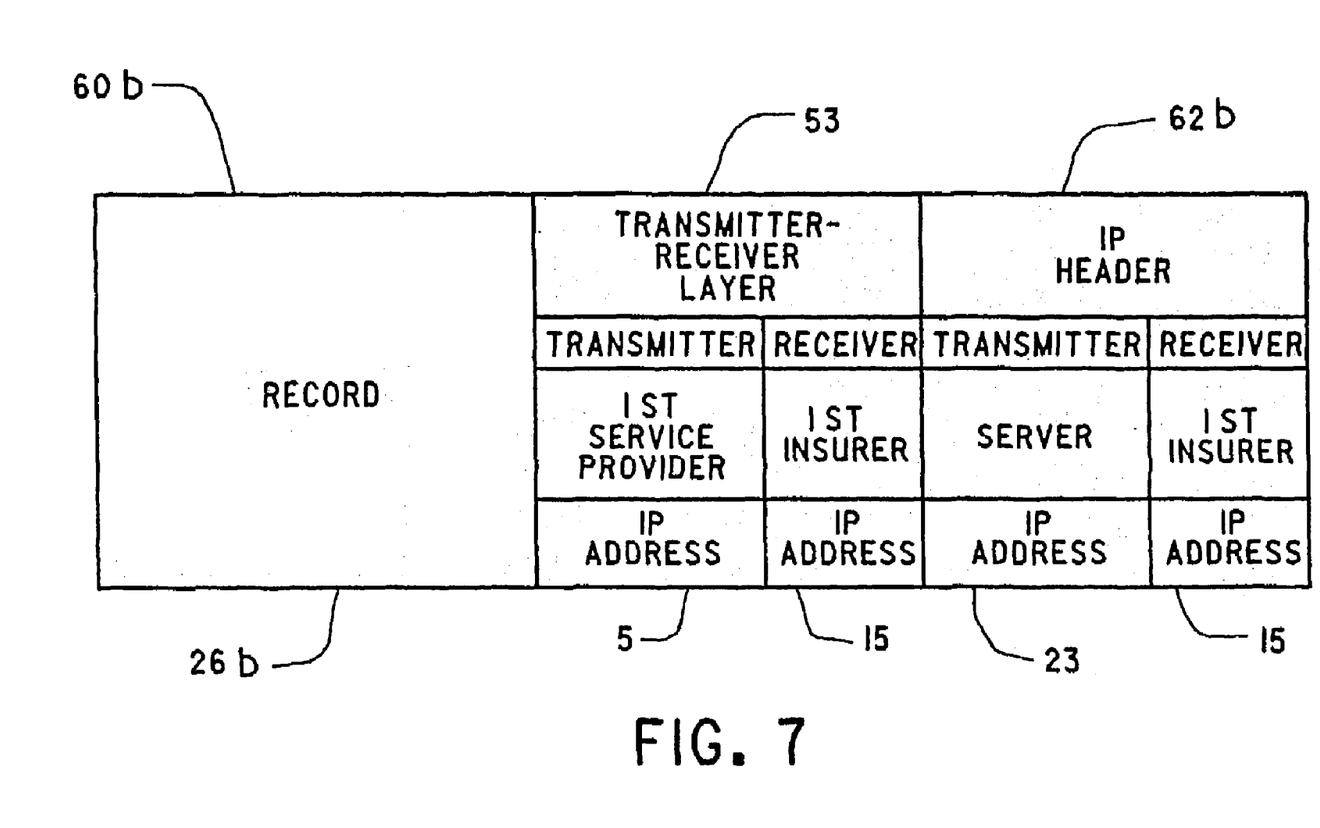
FIG. 7 is a block diagram of an outgoing packet directed to the first insurer database from a server.

The present invention addresses this problem through the use of transmitter-receiver layer 53 which retains with the data packet the transmitter IP address and the receiver IP address. For example, IP header 62*a* which was used to route packet 60*a* to server 22 has been destroyed after successful transmission of packet 60*a* to server 22, thereby removing any reference to first service provider 4 from packet 60*a*. It should be appreciated that the IP addresses contained in the transmitter-receiver layer 53 are static and remain in transmitter-receiver layer 53 from the moment first service provider 4 transmits record 26*a* until first insurer 14 receives record 26*b*. Server 22, can therefore create a new IP header 62*b* using the IP addresses contained in transmitter-receiver layer 53. Accordingly, server 22 determines the receiver IP address, e.g., IP address 15 of first insurer 14, by scanning IP address 15 from transmitter-receiver layer 53. IP address 15 is then designated as the receiver IP address in IP header 62*b*. IP address 23 of server 22 is designated as the transmitter IP address in IP header 62*b*. Accordingly, server 22 bundles record 26*b*, the original transmitter-receiver layer 53, and IP header 62*b*, into an outgoing packet 60*b*, as shown in FIG. 7. Packet 60*b* is then routed from server 22 through Internet 20 to first insurer 14.

After an insurer record has been entered and processed into the insurer database, the insurer may wish to send an acknowledgement to the service provider informing the service provider that the patient claim has been received, approved, disapproved, that there is a request for additional information to justify a requested fee for a rendered service, and/or the like.

Figure 8:
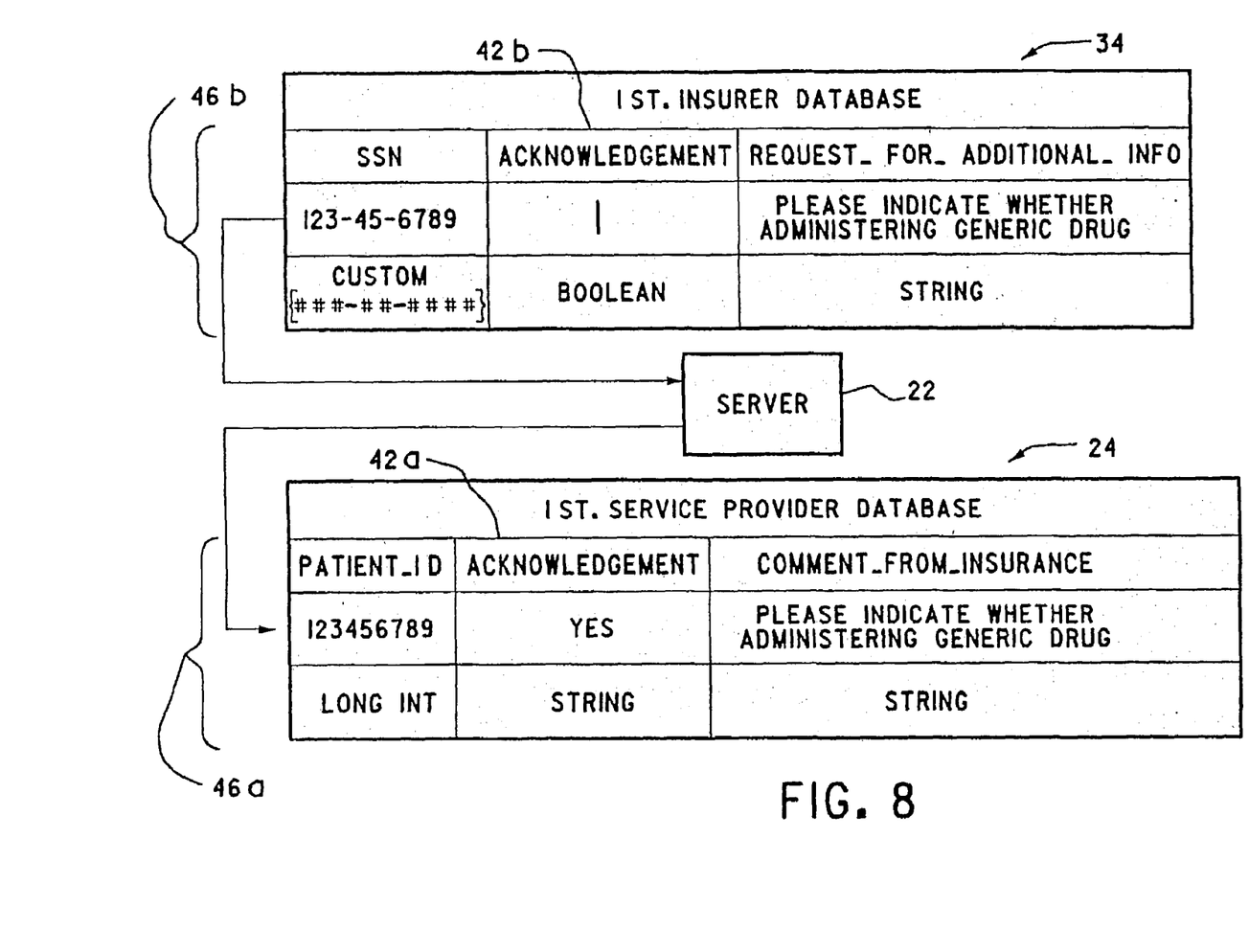
FIG. 8 is a block diagram representing the exchange of data from an insurer database to a service provider database through the server.

For example, with reference to FIG. 8 and with continuing reference to FIGS. 1, 2, 3, and 5, FIG. 8 depicts the transmission of an acknowledgement 42*b* in the form of a record 46*b* from first insurer 14 to first service provider 4. The transmission of record 46*b* from first insurer 14 to first service provider 4 requires the transposition of the transmitter-receiver layer information, e.g., the first insurer 14 is designated as the transmitter and the first service provider 4 is designated as the receiver. Upon record 46*b* reaching server 22, a different conversion routine is applied to record 46*b*. For example, the transmitter-receiver conversion matrix 50 scans transmitter-receiver layer 53 as before, but this time, determines that the transmitter of record 46*b* is insurer 14 and that the receiver is first service provider 4. Accordingly, conversion matrix 50 selects and applies conversion routine 44 to record 46*b*. This results in the conversion of the appropriate description fields, data fields, and datatype fields into description fields, data fields, and datatype fields which match the data format of database 24 of first service provider 4. In the instant case, the acknowledgement field 42*b*, of record 46*b* is converted into an acknowledgement field 42*a* of record 46*a*. Server 22 then determines the receiver IP address by scanning the receiver IP address from the transmitter-receiver layer, therefore having the receiver IP address designated as the receiver IP address in the IP header. Additionally, the IP address of the server 22 is designated as the transmitter IP address in the IP header. Accordingly, the outgoing packet from server 22 includes record 46*a*, the transmitter-receiver layer, and the IP header. The outgoing packet is then routed from server 22 through Internet 20 to first service provider 4. After first service provider 4 receives record 46*a* from server 22, first service provider database 24 updates its patient records accordingly.

As can be seen, the present invention provides a method of communicating data across a distributing computer network between computer systems having different record formats. The present invention also provides a method for having IP addresses of a transmitter and a receiver accompanying a data packet to its intended destination while passing through one or more designated intermediate receivers.

The present invention has been described with reference to the preferred embodiments. Obvious modifications, combinations, and alterations will occur to others upon reading the preceding detailed description. It is intended that the invention be construed as including all such modifications, combinations, and alterations insofar as they come within the scope of the appended claims or the equivalents thereof.

I claim:

1. A method of communicating data between databases having different formats, the method comprising the steps of: providing a first computer, a second computer, and a server in a distributed computer network, the server configured to send and receive data packets including records having different formats between the first computer and the second computer, the server configured to convert a record format of a record received from the first computer into a record format of a record of the second computer, and vice versa, wherein the server includes:
   a packet sniffer configured to separate from a first data packet a first record in a first format and a first transmitter-receiver layer, the packet sniffer also configured to separate from a second data packet a second record in a second format and a second transmitter-receiver layer;
   a transmitter-receiver conversion matrix configured to scan the first transmitter-receiver layer and the second transmitter-receiver layer; and
   a convert function configured to use at least one conversion routine for converting the first record in the first format into a first record in a second format and/or for converting the second record in the second format into the second record in the first format, with each layer and/or the second conversion based on the scanning of the first transmitter-receiver transmitter-receiver layer, respectively.

2. The method of claim 1 wherein the transmitter-receiver conversion matrix includes a first conversion routine configured to convert the first record in the first format into the first record in the second format.

3. The method of claim 1 wherein the transmitter-receiver conversion matrix selects the first conversion routine based upon the first transmitter-receiver layer.

4. The method of claim 1 wherein the transmitter-receiver conversion matrix includes a second conversion routine configured to convert the second record in the first format into the second record in the second format.

5. The method of claim 1 wherein the transmitter-receiver conversion matrix selects the second conversion routine based upon the second transmitter-receiver layer.

6. The method of claim 1 wherein the convert function applies the first conversion routine to the first record in the first format to convert the first record in the first format to the first record in the second format.

7. The method of claim 1 wherein the convert function applies the second conversion routine to the second record in the second format to convert the second record in the second format to the second record in the first format.

8. The method of claim 1 wherein the server is configured to send a first data packet to the second computer and a second data packet to the first computer.

9. The method of claim 1 wherein the first data packet includes the first record in the second format, a first transmitter-receiver layer, and a first IP header.

10. The method of claim 1 wherein the second data packet includes the second record in the second format, a second transmitter-receiver layer, and a second IP header.

* * * * *

UNITED STATES PATENT AND TRADEMARK OFFICE
CERTIFICATE OF CORRECTION

PATENT NO. : 7,120,636 B2
APPLICATION NO. : 10/333897
DATED : October 10, 2006
INVENTOR(S) : Pendelton Page 1 of 1

It is certified that error appears in the above-identified patent and that said Letters Patent is hereby corrected as shown below:

<u>Title Page</u>, See Item (57) ABSTRACT, Line 7, "an the second" should read
-- and the second --

<u>Column 7</u>, Claim 1, Lines 25-28, delete the following text:
"with each layer and/or the second conversion based on the scanning of the first transmitter-receiver transmitter-receiver layer, respectively"
and insert the following text:
-- with each conversion based on the scanning of the first transmitter-receiver layer and/or the second transmitter-receiver layer, respectively. --

Signed and Sealed this

Twentieth Day of March, 2007

JON W. DUDAS
*Director of the United States Patent and Trademark Office*